United States Patent [19]

Miyazawa et al.

[11] Patent Number: 4,663,696
[45] Date of Patent: May 5, 1987

[54] DUAL PURPOSE LAMP ASSEMBLY FOR USE, FOR EXAMPLE, AS A COMBINED FOG AND CORNERING LAMP ON A MOTOR VEHICLE

[75] Inventors: Kenji Miyazawa; Touichi Kamimura, both of Shizuoka, both of Japan

[73] Assignee: Koito Siesakusho Co., Ltd., Tokyo, Japan

[21] Appl. No.: 823,796

[22] Filed: Jan. 29, 1986

[30] Foreign Application Priority Data

| Jan. 31, 1985 | [JP] | Japan | 60-13547[U] |
| Nov. 13, 1985 | [JP] | Japan | 60-254542 |
| Nov. 13, 1985 | [JP] | Japan | 60-254543 |
| Nov. 13, 1985 | [JP] | Japan | 60-254544 |
| Nov. 13, 1985 | [JP] | Japan | 60-254545 |

[51] Int. Cl.⁴ ............................................. B60Q 1/18
[52] U.S. Cl. ..................... 362/80; 362/284; 362/299; 362/309; 362/346
[58] Field of Search ............. 362/61, 80, 299, 306, 362/308, 309, 346, 284, 277

[56] References Cited

U.S. PATENT DOCUMENTS 4,186,428  1/1980  Deverrewaere .
4,293,897 10/1981  Deverrewaere .
4,340,928  7/1982  Hohmann, Jr. .

Primary Examiner—Larry I. Schwartz
Attorney, Agent, or Firm—Browdy and Neimark

[57] ABSTRACT

A lamp assembly integrally comprising the functions of a fog lamp and a cornering lamp on a motor vehicle. Included are an electric bulb or like light source immovably mounted within a lamp housing, a fixed reflector behind the light source, and a movable reflector between the light source and the fixed reflector. The fixed reflector reflects the light rays from the source in the forward direction of the lamp assembly. Considerably less in size than the fixed reflector, the movable reflector is pivotable between a first position, where it coacts with the fixed reflector to reflect the light rays from the source forwardly as when the lamp assembly is being used as a fog lamp, and a second position where the movable reflector deflects part of the light rays from the source toward one side of the lamp assembly as when the lamp assembly is desired to serve the additional function of a cornering lamp. An electric control circuit can be provided to cause the displacement of the movable reflector from the first to the second position upon manual activation of a cornering switch. An alternate embodiment is disclosed which has but one reflector.

18 Claims, 11 Drawing Figures

DUAL PURPOSE LAMP ASSEMBLY FOR USE, FOR EXAMPLE, AS A COMBINED FOG AND CORNERING LAMP ON A MOTOR VEHICLE

BACKGROUND OF THE INVENTION

Our invention relates to lighting devices, to electric lamps, and in particular to a lamp assembly of novel configuration capable of throwing beams of light in either one or two different directions as required. The dual purpose lamp assembly in accordance with our invention finds a typical application as an integral combination of a fog lamp and a cornering lamp which have heretofore been employed separately on a motor vehicle, although we do not wish our invention to be unnecessarily limited to this particular application.

Motor vehicles today are equipped with a variety of lamps for a variety of purposes. Among them are the fog lamp and the cornering lamp. As the name implies, the fog lamp provides road illumination, possibly in conjunction with the lower beam headlamps, forwardly of the vehicle under conditions of rain, snow, dust, or fog. The cornering lamp, on the other hand, is used in combination with the turn signal system to supplement the headlamps by providing additional illumination in the direction of vehicle turn.

Thus, as the fog lamp and the cornering lamp are intended for the distinctly different purposes, providing illumination in different directions, there have conventionally mounted to each vehicle one pair of fog lamps and one pair of cornering lamps. The manufacturing costs of motor vehicles will become appreciably less if the number of lamps thereon is reduced without loss or diminution of their intended functions. Moreover, vehicles decorated with so many lamps are, in some instances, objectionable from an aesthetic point of view.

SUMMARY OF THE INVENTION

We have hererby invented a novel dual purpose lamp assembly which is particularly well suited for use as a combined fog and cornering lamp on motor vehicles.

Stated broadly, the dual purpose lamp assembly in accordance with our invention comprises a light source fixedly mounted within housing means. Also mounted within the housing means is a reflector means for reflecting the rays of light from the source normally in a predetermined direction forwardly of the lamp assembly. The reflector means is capable of actuation for angling at least part of the light rays from the source toward either side of the lamp assembly. Drive means are also provided for actuating the reflector means to cause the same to reflect at least part of the light rays in the angled direction toward either side of the lamp assembly.

Preferably, for optimum light distributions in an intended use of the lamp assembly as a combined fog and cornering lamp, the reflector means comprises a fixed reflector and a movable reflector. The movable reflector is actuable for angular displacement between a first position, where the movable reflector coacts with the fixed reflector for reflecting the light rays from the source in the predetermined forward direction of the lamp assembly, and a second position where the movable reflector reflects part of the light rays from the source toward either side of the lamp assembly.

The fixed and movable reflectors can both be paraboloidal reflectors, with the fixed reflector disposed behind the movable reflector, producing parallel rays of light from the source located at their common focus. The movable reflector may advantageously be pivoted about an axis passing the common focus of both reflectors and, therefore, the light source.

The drive means for the angular displacement of the movable reflector typically comprise a reversible electric motor together with an associated control circuit including a hand operated cornering switch. The actuation of this cornering switch results in the movement of the movable reflector from the first to the second position, whereupon the lamp assembly will throw part of its beam in the direction of vehicle turn. Upon deactuation of the cornering switch, then, the movable reflector will automatically return to the first position, and the lamp assembly will then function as a fog lamp only.

In the use of the dual purpose lamp assembly of our invention as a combined fog and cornering lamp, each motor vehicle requires two such lamp assemblies on its opposite sides. We have therefore constructed the lamp assembly so as to be installable on either side of the vehicle without any substantial alteration of its constituent parts. Toward this end the movable reflector is made pivotable from its first or neutral position to either of two angled positions which are angularly displaced from the neutral position toward both sides of the lamp assembly. Further, for the same purpose, we have employed a two way drive linkage which connects the output shaft of a drive assembly to the movable reflector in a different way depending upon which side of the motor vehicle the lamp assembly is to be installed on. Thus, merely by changing the manner of connection between the drive assembly output shaft and the movable reflector by the two way drive linkage, the movable reflector can be pivoted from the neutral position toward either of the two angled positions in response to the rotation of the drive assembly output shaft in the same direction. Normally, the movable reflector can be positively maintained in the neutral position by a neutralizing mechanism constituting an additional feature of our invention.

The above and other features and advantages of our invention and the manner of realizing them will become more apparent, and the invention itself will best be understood, from a study of the following description and appended claims, with reference had to the attached drawings showing the preferred embodiments of our invention.

DESCRIPTION OF THE PREFERRED EMBODIMENTS

General

We will first explain the general organization of the dual purpose lamp assembly illustrated in FIGS. 1 through 10 by way of a preferable embodiment of our invention, listing its major components. This embodiment represents an adaptation of the lamp assembly of our invention for use on a motor vehicle as a combined fog and cornering lamp, to be installed on either side of the vehicle only with a minimum modification of construction.

Figure 1:
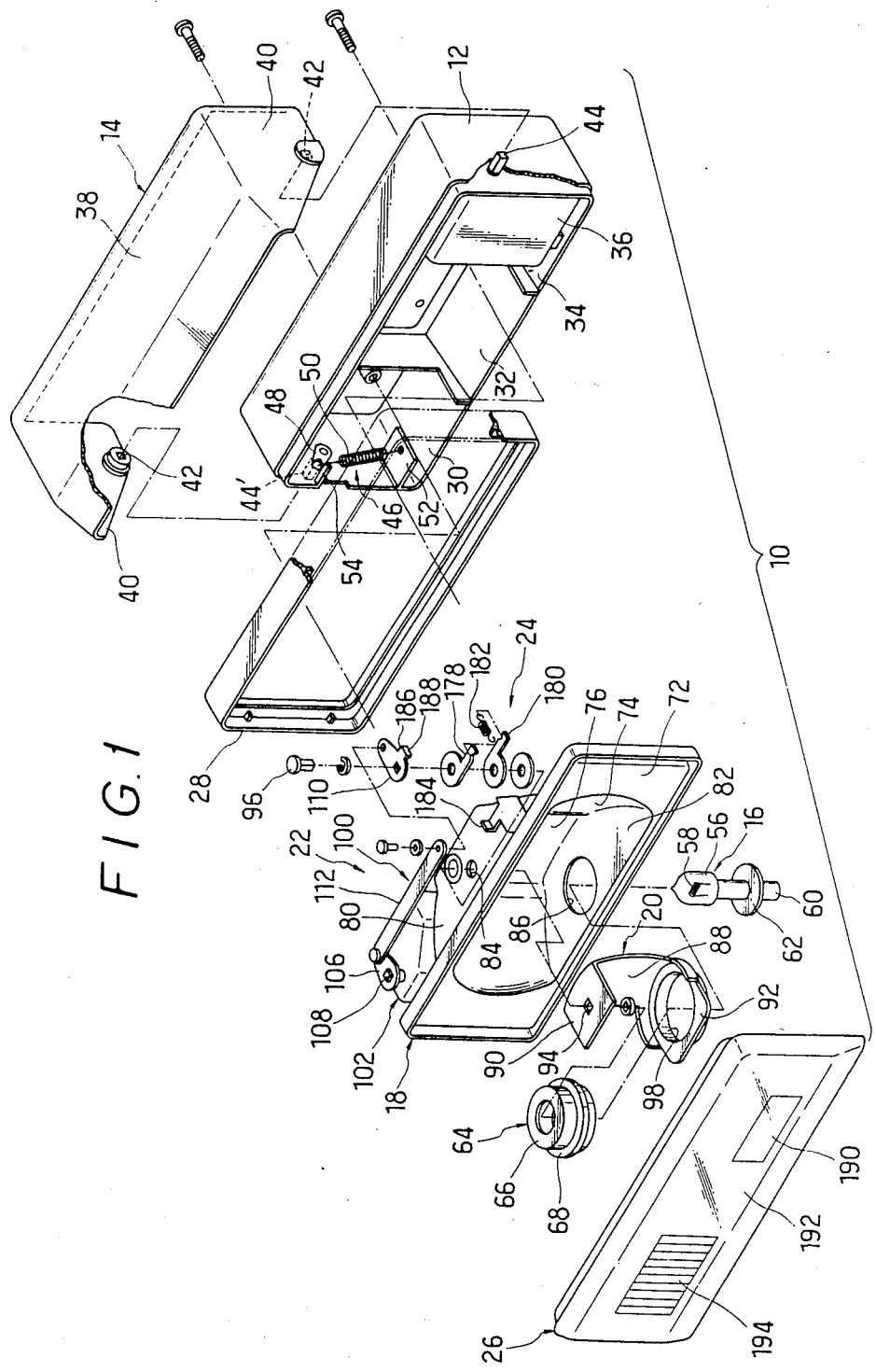
FIG. 1 is an exploded perspective view of the dual purpose lamp assembly constructed in accordance with the novel concepts of our invention, the lamp assembly being herein shown as adapted for use as a combined fog and cornering lamp on a motor vehicle.

FIG. 1 best illustrates the general organization of the dual purpose lamp assembly. Generally designated 10, the lamp assembly broadly comprises:

1. A housing 12 in the form of a box having an open front end.

2. A lamp cover 14 pivotally mounted on the housing 12 for covering and uncovering its front end.

3. A light source 16 immovably mounted in a preassigned position within the housing 12.

4. A fixed reflector 18 disposed behind the light source 16 for reflecting the rays of light therefrom generally forwardly of the lamp assembly 10.

5. A movable reflector 20, considerably less in size than the fixed reflector 18, disposed between the light source 16 and the fixed reflector 18 and pivotable between a first or neutral position, where the movable reflector coacts with the fixed reflector for reflecting the light rays from the source forwardly of the lamp assembly 10, and a second or angled position angularly displaced from the neutral position toward either side of the lamp assembly, where the movable reflector angles part of the light rays from the source toward the same side of the lamp assembly.

6. A two way drive mechanism 22 also mounted within the housing 12 and mostly disposed behind the fixed reflector 18 for driving the movable reflector 20 between the neutral and either of the two angled positions.

7. A neutralizing mechanism 24 for normally holding the movable reflector 20 in the neutral position.

8. A lens 26 closing the open front end of the housing 12.

We will discuss hereinbelow these listed components of the lamp assembly 10 under the respective headings, in the order of the above enumeration.

Housing

As will be seen from FIGS. 1 through 4, the housing 12 is in the form of a box, rather elongated horizontally and opening forwardly. The open front end of the housing 12 is closed by the lens 26 via a rectangular lens holder frame 28. As indicated in FIG. 1, the interior of the housing 12 is partitioned into a left hand chamber 30 for mostly accommodating part of the two way drive mechanism 22, a central chamber 32 for mostly accommodating the fixed and movable reflectors 18 and 20, and a right hand chamber 34 for accommodating a lamp cover drive mechanism 36 yet to be described.

Lamp Cover

Figure 3:
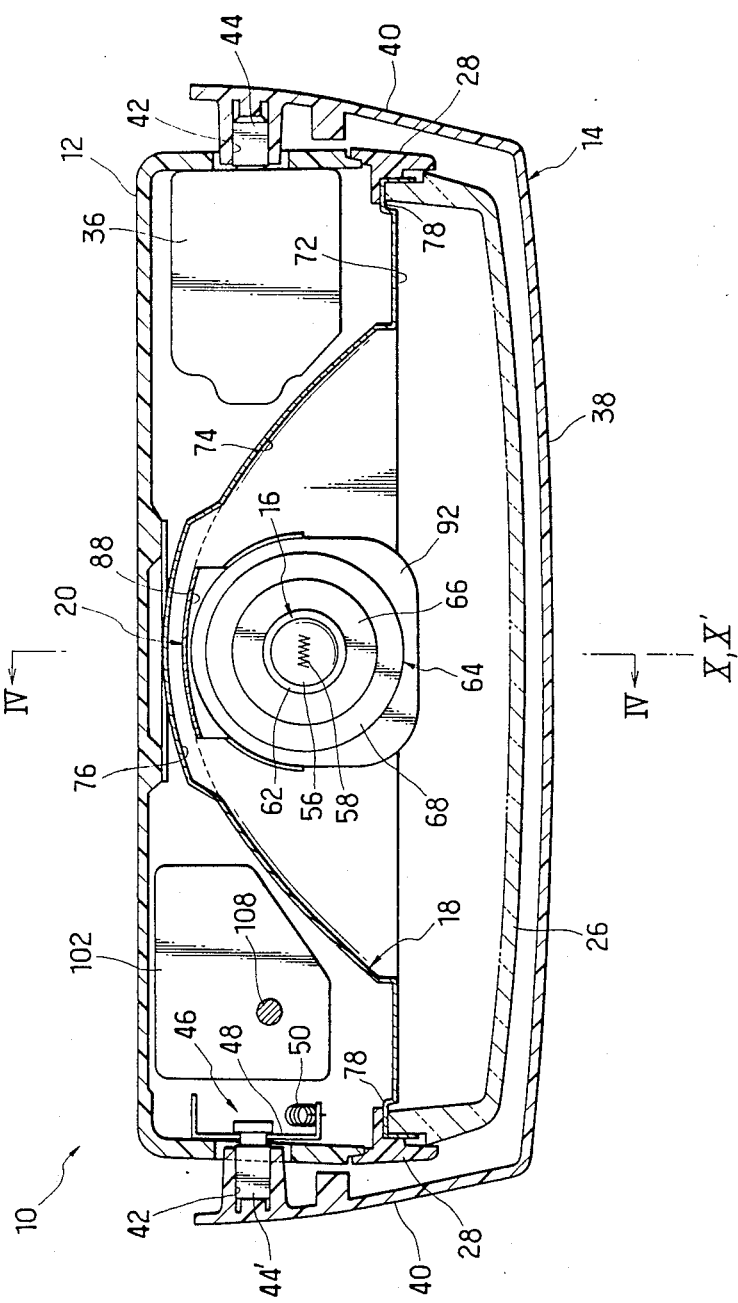
FIG. 3 is a horizontal section through the lamp assembly, taken along the line III—III in FIG. 2.
Figure 4:
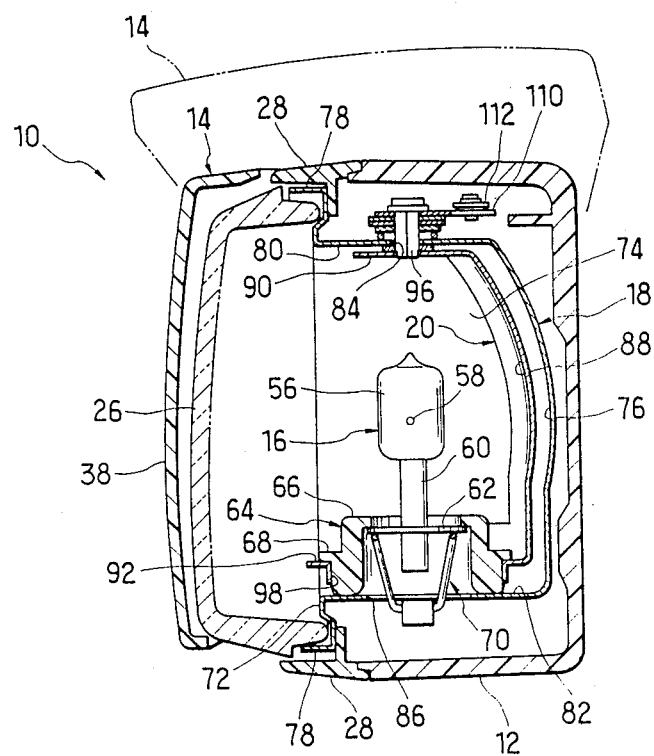
FIG. 4 is a vertical section through the lamp assembly, taken along the line IV—IV in FIG. 3.

With reference to FIGS. 1, 3 and 4 the lamp cover 14 comprises a major portion 38 of approximately the same size and shape as the lens 26, and a pair of side flanges 40 at both lateral ends of the major portion. As seen in both FIGS. 1 and 3, the side flanges 40 of the lamp cover 14 have a pair of holes 42 of square cross section formed one in each side flange for nonrotatably receiving a pair of trunnions 44 and 44' rotatably protruding from the opposite sides of the housing 12. Thus the lamp cover 14 is pivotable with respect to the housing 12 between a working position indicated by the solid lines in FIG. 4 and a retracted position indicated by the dashed lines in the same figure. The lamp cover 14 covers the lens 26 when in the working position and uncovers the lens on being pivoted to the retracted position. Of course, the lamp cover 14 lies in the working position when the lamp assembly 10 is unlit, and is pivoted to the retracted position when the lamp assembly is lit up. Such angular displacement of the lamp cover 14 can be automatic. The angular distance between the working and retracted positions may be approximately 90 degrees.

We have employed for such pivotal movement of the lamp cover 14 the lamp cover drive mechanism 36 which is mounted as aforesaid within the housing 12 and the output shaft of which constitutes the right hand trunnion 44, as seen in FIGS. 1 and 3. The lamp cover drive mechanism 36 comprises a reversible electric motor together with an associated control circuit for controlling the rotation of the motor and hence of the right hand trunnion 44. We have not shown the individual components of the lamp cover drive mechanism because this mechanism is per se conventional. Reference may be had to Japanese Patent Application No. 60-175492 for further details of its construction.

The left hand trunnion 44', on the other hand, is provided with a two way biasing mechanism 46, FIGS. 1 and 3, disposed within the housing 12. The two way biasing mechanism 46 comprises an arm 48 having a proximal end nonrotatably coupled to the left hand trunnion 44' and extending right angularly therefrom, and a helical tension spring 50 acting between the distal end of the arm 48 and a spring retainer ledge 52 on one of the opposite side walls of the housing 12. The tension spring 50 biases the left hand trunnion 44' and hence the lamp cover 14 toward either of the working and retracted position depending upon its angular position and becomes neutral, biasing the lamp cover toward neither position, when the same is midway between the two positions. The arm 48 is provided with a pair of stops, one seen at 54 in FIG. 1, for positively holding the lamp cover 14 in the working and retracted positions under the bias of the tension spring 50.

Light Source

As shown also in FIGS. 1, 3 and 4, the light source 16 can take the form of a conventional electric bulb having a glass envelope 56 and a filament 58 enclosed therein. The envelope 56 is mounted on the top of a stem 60 having a mounting flange 62 formed thereon. At 64 is shown a bulb support approximately in the shape of an upstanding tube having an inturned rim 66 on its top end and a mounting flange 68 formed exteriorly midway between its top and bottom ends. Received within the bulb support 64, the mounting flange 62 on the stem 60 of the bulb 16 is held fast against the underside of the bulb support rim 66, with the result that the bulb is concentric with the bulb support 64. The bulb 16 and the bulb support 64 are rigidly held together in this positional relationship, as by means shown at 70 in FIG. 4.

Supporting the bulb 16 as above stated, the bulb support 64 is mounted on the fixed reflector 18 and is further rotatably coupled to the movable reflector 20, with the bult filament 58 disposed at the common focus of the fixed and movable reflectors 18 and 20. We will later explain in more detail such connections of the bulb support 64 with the fixed and movable reflectors 18 and 20, in the course of the following detailed descriptions of these reflectors.

Fixed Reflector

We will refer also to FIGS. 1, 3 and 4 for the detailed description of the fixed reflector 18. The fixed reflector 18 comprises a flat wall portion 72 of generally rectangular shape disposed immediately behind the lens 26, and a reflective portion 74 concaved rearwardly from the wall portion 72. The wall portion 72 and reflective portion 74 can be a one piece pressing of sheet metal, with the front face of at least the reflective portion 74 made reflective as by the vapor deposition of aluminum. The reflective portion 74 is substantially in the shape of a paraboloid of revolution; that is, the fixed reflector 18 is a paraboiloidal reflector. Further, perhaps as best seen in FIG. 3, the reflective portion 74 has a midportion 76 recessed further rearwardly therefrom for accommodating the movable reflector 20. This recessed midportion 76 is also approximately in the shape of a paraboloid of revolution, and its front face is rendered reflective as by aluminum vapor deposition.

FIGS. 3 and 4 indicate that the rectangular wall portion 72 of the fixed reflector 18 has its marginal edges shaped into approximately U shaped mounting flanges 78. These flanges are caught fast between the lens 26 and the lens holder frame 28. Thus mounted in place within the housing 12, the fixed reflector 18 has its reflective portion 74 centered about the main optical axis X—X, FIG. 3, of this lamp assembly 10.

As the reflective portion 74 of the fixed reflector 18 is concaved as above, there are created a flat top portion 80 and a flat bottom portion 82 joining the reflective portion 74 to the wall portion 72. The top portion 80 has a relatively small diameter hole 84 formed approximately centrally therein, whereas the bottom portion 82 has formed therein a larger diameter hole 86 in axial alignment with the small diameter hole 84. The bulb support 64 is immovably mounted on the bottom portion 82 in concentric relation with the large diameter hole 86.

Movable Reflector

With reference directed further to FIGS. 1, 3 and 4 the movable reflector 20 comprises a reflective portion 88 in the shape of a paraboloid of revolution, rectangular and rather elongated vertically as seen in a front view, and a pair of flanges 90 and 92 extending forwardly from the top and bottom ends of the reflective portion. The reflective portion 88 together with the flanges 90 and 92 can also be an integral pressing of sheet metal, with the front face of the reflective portion rendered reflective as by aluminum vapor deposition.

The top flange 90 of the movable reflector 20 has a square opening 94 defined centrally therein. Nonrotatably received in this square opening 94 is a drive pin 96 of like cross sectional shape rotatably extending upwardly through the hole 84 in the flat top portion 80 of the fixed reflector 18. The drive pin 96 is coupled to, or forms a part of, the two way drive mechanism 22, as will be detailed presently, for pivotally supporting the movable reflector 20 and further for imparting bidirectional rotation thereto. As will be noted from FIG. 4, the drive pin 96 is in vertical alignment with the light source 16.

The movable reflector bottom flange 92, on the other hand, is adapted to be rotatably coupled to the bulb support 64 of the light source 16. To be so coupled to the bulb support 64 the movable reflector bottom flange 92 has a relatively large diameter hole 98 defined therein in axial alignment with the hole 86 in the fixed reflector bottom portion 82. The hole 98 rotatably receives the bulb support 64 rigidly mounted on the fixed reflector bottom portion 82, with the flange 68 of the bulb support slidably engaging the edge of the movable reflector bottom flange 92 bounding the hole 98.

Thus, as is clear from the foregoing, the movable reflector 20 is supported between the light source 16 and the fixed reflector 18 for rotation about the vertical axis passing the common focus of the fixed and movable reflectors. The light source 16, or its bulb filament 58, is located at this common focus of the fixed and movable reflectors 18 and 20. The width of the movable reflector 20 may be approximately half the width of the recessed midportion 76 of the fixed reflector 18 for the optimum light distributions of this lamp assembly 10.

Two Way Drive Mechanism

Figure 5:
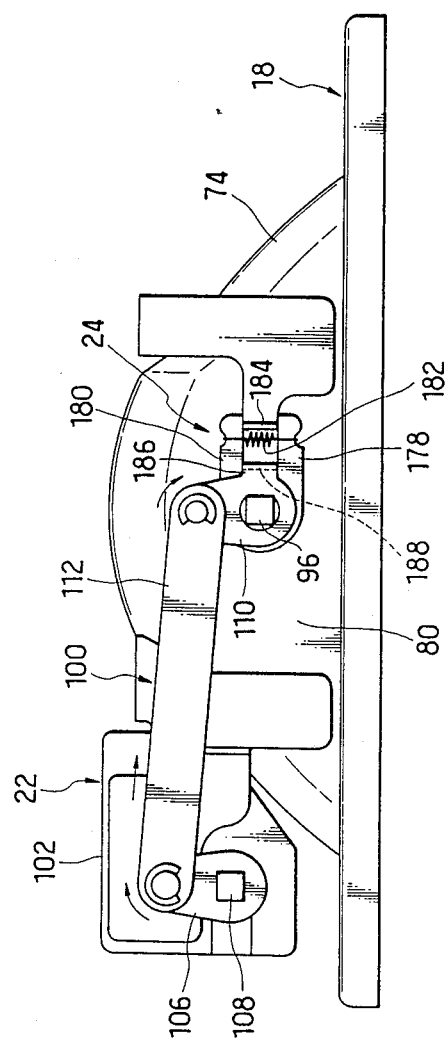
FIG. 5 is a top plan of the fixed reflector and two way drive mechanism of the lamp assembly of FIG. 1, the drive mechanism being herein shown in a state for holding the movable reflector in the neutral position and as adapted for causing the movable reflector to turn in a clockwise direction, as viewed in this figure, on actuation.
Figure 6:
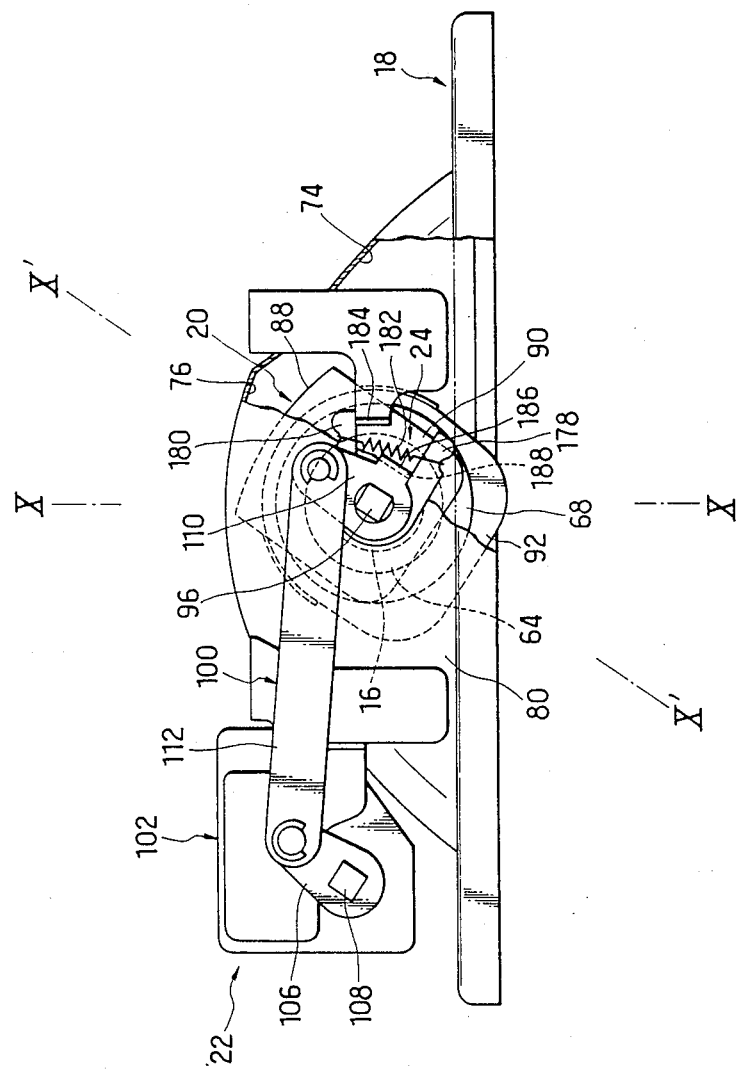
FIG. 6 is a view similar to FIG. 5 except that the two way drive mechanism is shown actuated to cause the clockwise turn of the movable reflector from the neutral position of FIG. 5 to one of the two angled positions, the fixed reflector being herein shown partly broken away to reveal part of the movable reflector.

We will refer to FIGS. 1 and 5 through 9 for the detailed discussion of the two way drive mechanism 22. As incorporated in this particular embodiment of our invention, the two way drive mechanism is adapted for pivot the movable reflector 20 between its first or neutral position, best represented in FIG. 3, and either of the two second or angled positions which are angularly displaced from the neutral position toward both sides of the lamp assembly 10 and one of which is shown in FIG. 6. Whether the movable reflector 20 is pivoted to one or the other of the two angled positions depends upon which side of a motor vehicle the lamp assembly 10 is to be installed on.

When the movable reflector 20 is in the neutral position as in FIG. 3, its optical axis X'—X' (the axis of the paraboloid of revolution formed by its reflective portion 88) coincides with the optical axis X—X of the fixed reflector 18. Consequently, both fixed and movable reflectors 18 and 20 conjointly produce parallel light rays from the source 16 that are directed forwardly of the lamp assembly 10. This lamp assembly may therefore be used as fog lamp when the movable reflector 20 is in the neutral position.

When the movable reflector 20 is pivoted to a predetermined one of the two angled positions as in FIG. 6, its optical axis X'—X' becomes angled with respect to the optical axis X—X of the fixed reflector 18. In this angled position the movable reflector 20 throws part of the light rays from the source 16 in the direction of its angled axis X'—X' whereas the fixed reflector remains directing the remainder of the light rays from the source in the direction of its optical axis X—X, or forwardly of the lamp assembly 10. Thus, when the motor vehicle is to make a turn, the movable reflector 20 may be pivoted from the neutral to the required angled position for expanding the range of illumination in the direction of the turn.

The two way drive mechanism 22 comprises:

1. A two way drive linkage 100, best shown in FIGS. 5, 6 and 7, for transmitting bidirectional rotation to the movable reflector 20 to cause its pivotal motion between the neutral position and a predetermined one of the two angled positions.

2. A drive assembly 102, FIG. 8, for providing the bidirectional rotation to be transmitted to the movable reflector 20 by the two way drive linkage 100.

3. An electric control circuit 104, FIG. 9, for controlling the operation of the drive assembly 102.

We will describe hereinafter these components of the two way drive mechanism 22 under the respective subheads and then will proceed to the description of the operation of the complete two way drive mechanism.

1. Two Way Drive Linkage

Figure 7:
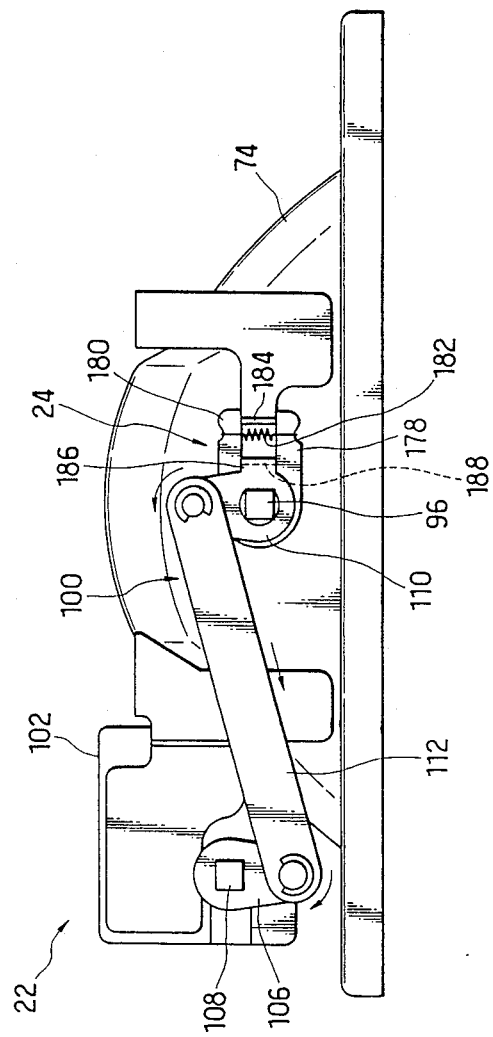
FIG. 7 is also a view similar to FIG. 5 except that the two way drive mechanism is shown adapted for causing the movable reflector to turn in a counterclockwise direction, as viewed in this figure, on actuation.

The two way drive linkage 100 connects the drive assembly 102 to the movable reflector 20 in two different ways, one shown in FIGS. 5 and 6 and the other in FIG. 7, depending upon which of the two angled positions the movable reflector is to be turned. We will first describe the connection of FIGS. 5 and 6.

Included in the two way drive linkage 100 is a first drive arm 106 having one end rigidly coupled to the output shaft 108 of the drive assembly 102 so as to extend right angularly therefrom. The drive assembly output shaft 108 is made square in cross section for a purpose to be made apparent presently. A second drive arm 110 has one end rigidly coupled to the drive pin 96 which rotatably extends upwardly from the flat top portion 80 of the fixed reflector 18 and which is further joined as aforesaid to the movable reflector 20 for joint rotation therewith. A drive link 112 is pivotally coupled at one end to the free end of the first drive arm 106 and at the other end to the free end of the second drive arm 110.

FIG. 5 represents the normal state of the two way drive linkage 100, that is, its state when the movable reflector 20 is in the neutral position. It will be observed that both first 106 and second 108 drive arms are oriented rearwardly, upwardly as viewed in FIG. 5, from their axes of rotation. Accordingly, upon clockwise rotation of the drive assembly output shaft 108, the two way drive linkage 100 will cause the movable reflector 20 to pivot clockwise, as indicated by the arrows in FIG. 6, to the angled position of FIG. 6.

In FIG. 7, on the other hand, we have shown the first drive arm 106 so connected to the drive assembly output shaft 108 as to extend forwardly therefrom in the normal state of the two way drive linkage 100. Therefore, with the clockwise rotation of the shaft 108, the two way drive linkage 100 will cause the movable reflector 20 to pivot counterclockwise to the other of the two different angled positions. Of course, instead of connecting the first drive arm 106 to the shaft 108 as in FIG. 7, we could connect the second drive arm 110 to the drive pin 96 in an angular position displaced 180 degrees from its FIGS. 5 and 6 position. The two way drive linkage 100 is thus well calculated to cause the angular displacement of the movable reflector 20 to either of the opposite directions in response to the rotation of the drive assembly output shaft 108 in the same direction.

2. Drive Assembly

Figure 8:
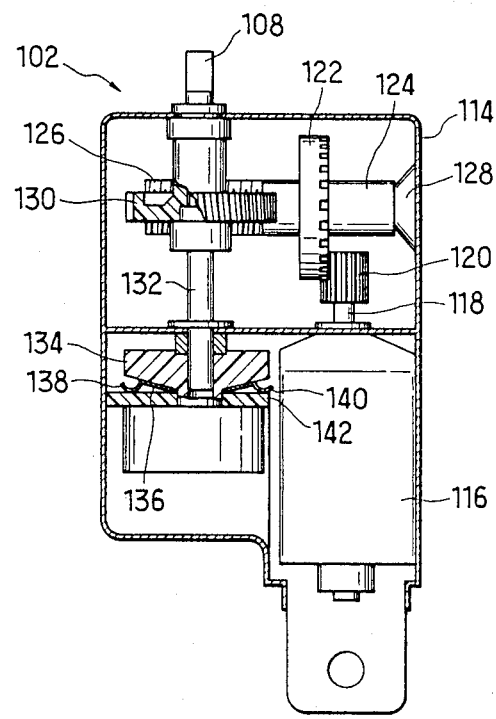
FIG. 8 is a vertical section through the drive assembly included in the two way drive mechanism of the lamp assembly of FIG. 1.

With reference to FIG. 8 the drive assembly 102 has a housing 114 which is disposed within the lamp assembly housing 12 and just behind the flat wall portion 72 of the fixed reflector 18. Mounted within the housing 114 is a reversible electric drive motor 116 having an output shaft 118. A pinion 120 on this motor output shaft 118 meshes with a crown wheel 122 on a blank portion 124 of a worm 126 rotatably cantilevered at 128 on the inside surface of the housing 114. The worm 126 meshes with a worm wheel 130 on the output shaft 108 of the drive assembly 102, which shaft protrudes upwardly of the drive assembly housing 114 for connection to the two way drive linkage 100. Thus the bidirectional rotation of the drive motor 116 is transmitted to the drive assembly output shaft 108 via the pinion 120, crown wheel 122, worm 126 and worm wheel 130.

The drive assembly output shaft 108 has a downward extension 132 terminating in a flange or contact carrier 134 capable of joint rotation with the shaft 108. Immovably mounted to the contact carrier 134 is a contact member 136 which preferably is made of a spring material and which has formed thereon first 138 and second 140 movable contacts in diametrically opposite positions with respect to the axis of the drive assembly output shaft 108. The contact member 136 is self biased to urge the movable contacts 138 and 140 against a fixed circuit board 142 within the drive assembly housing 114, in order that the movable contacts may travel into and out of sliding engagement with respective fixed contacts, not shown in FIG. 8, on the circuit board. We will say more about these movable and fixed contacts in the course of the following description of the control circuit 104.

3. Control Circuit

Figure 9:
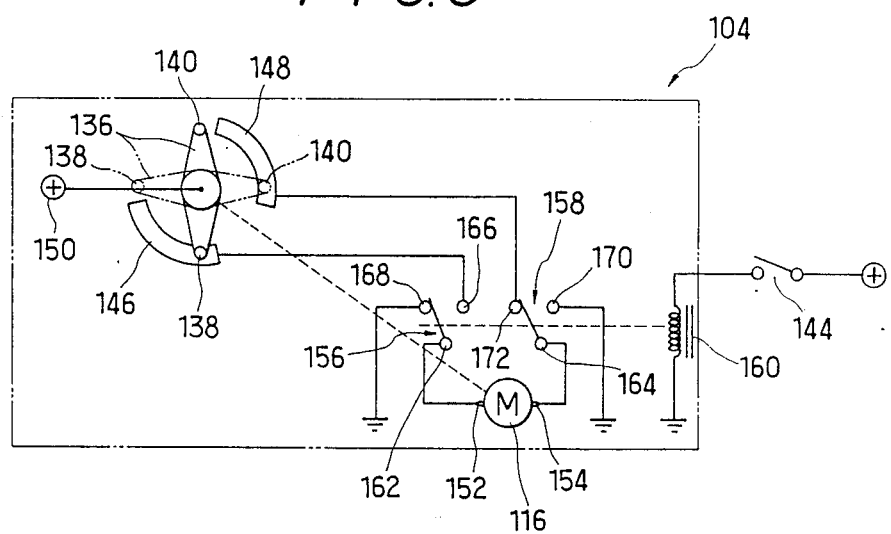
FIG. 9 is a schematic electrical diagram of the control circuit for the drive assembly of FIG. 8.
Figure 10:
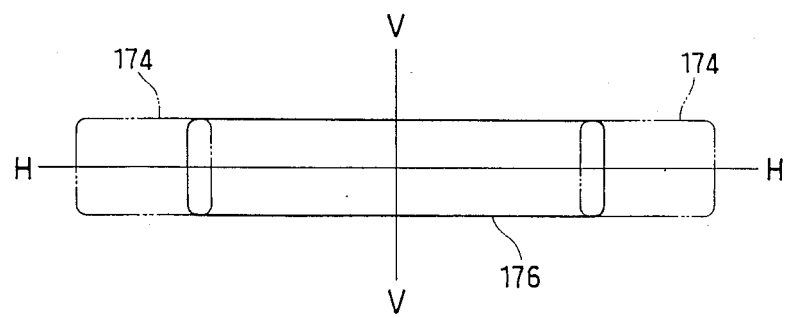
FIG. 10 is a diagrammatic illustration of the light distributions by a pair of dual purpose lamp assemblies, each constructed as in FIG. 1, when they are mounted on a motor vehicle as a pair of combined fog and cornering lamps.

As illustrated in FIG. 9, the electric control circuit 104 is associated with a cornering switch (reflector switch) 144 of normally open construction disposed within easy reach of the vehicle driver. The control circuit 104 functions to cause the movable reflector 20 to pivot from the neutral to the pedetermined one of the two angled positions upon closure of the cornering switch 144 and, when the switch is reopened, to cause the movable reflector to move back to the neutral position.

The control circuit 104 includes the aforesaid contact member 136 on the output shaft 108 of the drive assembly 102. The first 138 and second 140 movable contacts on this contact member are associated with first 146 and second 148 fixed contacts of arcuate shape disposed on the aforesaid circuit board 142 and centered about the axis of rotation of the contact member 136. Electrically connected to a power supply 150, the contact member 136 revolves between the solid line position, corresponding to the neutral position of the movable reflector 20, and the phantom position corresponding to the angled position of the movable reflector. The first movable contact 138 travels in sliding engagement with the first fixed contact 146 during the pivotal movement of the movable reflector 20 from the neutral toward the angled position and rides off the first fixed contact when the movable reflector reaches the angled position. The second movable contact 140 travels in sliding engagement with the second fixed contact 148 during the return excursion of the movable reflector 20 from the angled toward the neutral position and rides off the second fixed contact when the movable reflector returns to the neutral position.

The first 146 and second 148 fixed contacts are electrically connected to a pair of opposite polarity terminals 152 and 154 of the drive motor 116 via first 156 and second 158 motor control switches respectively. We have shown the motor control switches 156 and 158 as parts of a multicontrol relay having a coil 160 which is energized and deenergized by the on/off control of the cornering switch 144. Thus the motor control switches 156 and 158 have movable contacts 162 and 164, respectively, which are ganged together for actuation by the relay coil 160. Connected to the terminal 152 of the drive motor 116, the movable contact 162 of the first motor control switch 156 is engageable with a fixed contact 166 connected to the first fixed contact 146 and with another fixed contact 168 connected to ground. Connected to the other terminal 154 of the drive motor 116, the movable contact 164 of the second motor control switch 158 is engageable with a grounded fixed contact 170 and with another fixed contact 172 connected to the second fixed contact 148.

4. Operation of the Two Way Drive Mechanism

We have shown in FIG. 9 the control circuit 104 in its normal state, that is, when the movable reflector 20 is in the neutral position of FIG. 3 and when the two way drive linkage 100 is in the state of FIG. 5. The contact member 136 of the control circuit 104 is in engagement with the first fixed contact 146 via the first movable contact 138. The movable contacts 162 and 164 of the motor control switches 156 and 158 are in engagement with the fixed contacts 168 and 172 respectively. The cornering switch 144 is open. The lamp assembly 10 is then functioning as fog lamp.

The vehicle operator may actuate the cornering switch 144 when the vehicle is to turn. The closure of the cornering switch 144 results in the energization of the rlay coil 160 and hence in the activation of the movable contacts 162 and 164 of the motor control switches 156 and 158 into engagement with the fixed contacts 166 and 170 respectively. Now the drive motor 116 is set into rotation in a predetermined forward direction by being fed from the power supply 150 through the circuit comprising the contact member 136, the first fixed contact 146, the fixed contact 166 and movable contact 162 of the first motor control switch 156, the terminals 152 and 154 of the drive motor 116, the movable contact 164 and fixed contact 170 of the second motor control switch 158, and the ground.

With reference now directed to FIG. 8, the rotation of the drive motor 116 in the forward direction is transmitted to the output shaft 108 of the drive assembly 102 via the pinion 120, crown wheel 122, worm 126 and worm wheel 130.

The direction of the resulting rotation of the drive assembly output shaft 108 is clockwise as viewed in FIG. 5. Accordingly, if the two way drive linkage 100 is connected as shown in FIGS. 5 and 6, the clockwise rotation of the drive assembly output shaft 108 will result in the rotation of the movable reflector 20 in the same direction, to the angled position of FIG. 6. Now the movable reflector 20 will throw part of the light rays from the source 16 toward the right hand side of the vehicle on which the lamp assembly is mounted.

If the two way drive linkage 100 is connected as shown in FIG. 7, on the other hand, then the clockwise rotation of the drive assembly output shaft 108 will result in the counterclockwise rotation of the movable reflector 20 to the other angled position. The movable reflector 20 will then provide illumination toward the left hand side of the vehicle.

We recommend, therefore, that a pair of lamp assemblies each in accordance with out invention be provided on both sides of the front end of the motor vehicle, with one of the lamp assemblies having the two way drive linkage 100 connected as in FIGS. 5 and 6 and the other lamp assembly having the two way drive linkage connected as in FIG. 7. The movable reflectors 20 of both lamp assemblies may then be pivoted to the different angled positions in the opposite directions from their neutral position. The resulting light distributions by the oppositely angled movable reflectors 20 of the two lamp assemblies will be as indicated at 174 in FIG. 10 with respect to the horizontal axis H—H and vertical axis V—V, greatly expanded toward both sides of the light distribution 176 of the lamp assemblies when the movable reflectors are in neutral. The expansions 174 of illumination toward both sides of the normal light distribution 176 are particularly advantageous as when the vehicle is running a meandering road over mountains.

As the drive assembly output shaft 108 rotates as above, so does the contact member 136 on its downward extension 132. The first movable contact 138 on this contact member travels in sliding engagement with the first fixed contact 146 during such rotation of the drive assembly output shaft 108 and rides off the first fixed contact when the contact member reaches the phantom position of FIG. 9, that is, when the movable reflector 20 reaches either of the two angled positions. Thus disconnected from the power supply 150, the drive motor 116 is set out of rotation. The movable reflector 20 thus stays in the angled position as long as the cornering switch 144 remains closed. It will be observed from FIG. 9 that the second movable contact 140 on the contact member 136 rides onto the second fixed contact 148 immediately after the drive assembly output shaft 108 starts revolving clockwise, and remains in engagement with the second fixed contact when the movable reflector 20 is in the angled position.

The vehicle operator may deactuate and open the cornering switch 144 after the vehicle has completed the turn. Thereupon, with the relay coil 160 deenergized, the movable contacts 162 and 164 of the motor control switches 156 and 158 will reengage the fixed contacts 168 and 172 as shown in FIG. 9. Since now the contact member 136 on the drive assembly output shaft 108 is engaged with the second fixed contact 148 as above stated, the drive motor 116 will be fed from the power supply 150 through the circuit composed of the contact member 136, the second fixed contact 148, the fixed contact 172 and movable contact 164 of the second motor control switch 158, the terminals 154 and 152 of the drive motor 116, the movable contact 162 and fixed contact 168 of the first motor control switch 156, and the ground.

Thus the drive motor 116 is set into rotation in the reverse direction, with the consequent rotation of the drive assembly output shaft 108 in a counterclockwise direction as viewed in FIGS. 5 through 7. The two way drive linkage 100 transmits this counterclockwise rotation of the drive assembly output shaft 108 to the movable reflector 20 thereby causing the same to return to the neutral position of FIG. 3 from either of the two angled positions.

The contact member 136 also rotates with the drive assembly output shaft 108 until the second movable contact 140 thereon rides off the second fixed contact 148 when the movable reflector 20 returns to the neutral position. Then the drive motor 116 terminates rotation in the reverse direction.

Neutralizing Mechanism

We will refer principally to FIGS. 1, 5 and 6 for the detailed description of the neutralizing mechanism 24, although it appears also in FIG. 7 and in part in FIG. 4. The neutralizing mechanism 24 functions to hold the movable reflector 20 in the neutral position against accidental displacement toward either of the angled positions.

Included in the neutralizing mechanism 24 are a pair of biasing arms 178 and 180 proximally coupled to the drive pin 96 protruding upwardly of the fixed reflector top portion 80, for rotation independently of each other. A tension spring 182 extends between the distal ends of the biasing arms 178 and 180 for urging them toward each other. Rigidly mounted on the fixed reflector top portion 80, an abutment 184 is interposed between the biasing arms 178 and 180. The position of the abutment 184 in relation to the biasing arms 178 and 180 is such that both biasing arms are held against the opposite sides of the abutment under the force of the tension spring 182, as shown in FIG. 5 or 7, when the movable reflector 20 is in the neutral position.

Also included in the neutralizing mechanism 24 is a lateral protrusion 186 of the drive arm 110 nonrotatably mounted to the drive pin 96. The drive arm protrusion 186 terminates in a depending lug 188 engaged between the pair of biasing arms 178 and 180. The engaging lug 188 is approximately equal in width to the abutment 184 and is so positioned with respect to the drive arm 110 as to hold the biasing arms 178 and 180 in contact with the abutment when the movable reflector 20 is in neutral.

Therefore, upon clockwise turn of the drive arm 110 for pivoting the movable reflector 20 from the neutral to one of the angled positions shown in FIG. 6, the engaging lug 188 thereon will cause the first biasing arm 178 to turn in the same direction with the drive arm in opposition to the force of the tension spring 182 as the second biasing arm 180 remains in engagement with the abutment 184. Similarly, upon counterclockwise turn of the drive arm 110 for pivoting the movable reflector 20 to the other angled position, as has been stated in connection with FIG. 7, the engaging lug 188 will cause the second biasing arm 180 to turn with the drive arm against the effect of the tension spring 182 as the first biasing arm 178 remains in engagement with the abutment 184.

When the movable reflector 20 is subsequently driven back to the neutral position from either of the two angled positions, the tension spring 182 will contract to bring either of the biasing arms 178 and 180 back into engagement with the abutment 184 as shown in FIG. 5 or 7. The drive motor 116 may not come to a stop exactly when the movable reflector 20 is neutralized; instead, the motor may over- or underdrive the movable reflector. In either case, however, the tension spring 182 will act to pull either of the biasing arms 178 and 180 into engagement with the abutment 184 because the drive motor 116 is not braked when the cornering switch is open.

It is thus seen that the neutralizing mechanism 24 serves to hold the movable reflector 20 in the exact neutral position when the lamp assembly 10 is not required to perform the cornering lamp function. The neutralizing mechanism 24 with the pair of sprung arms 178 and 180 offers the advantage of offering far less shocks than in the case where rigid stops are employed for arresting the rotation of the drive arm 110 or of an equivalent part.

Lens

Figure 2:
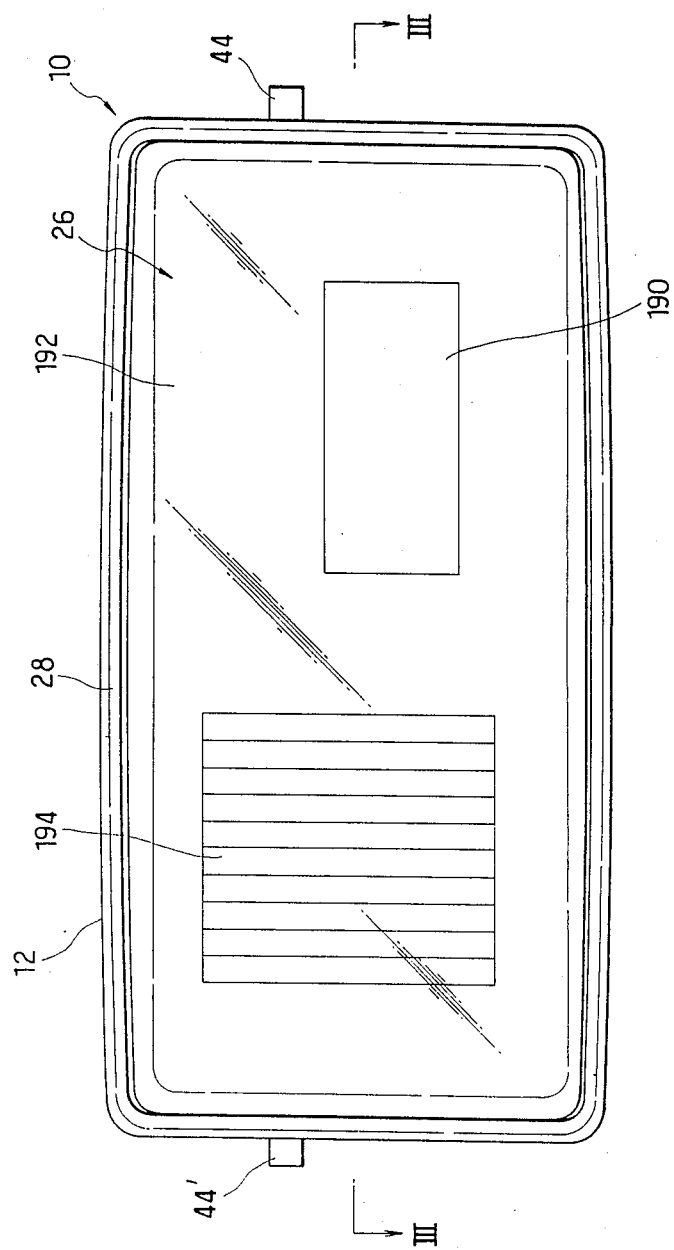
FIG. 2 is an enlarged front elevation of the lamp assembly of FIG. 1, the lamp assembly being herein shown without the lamp cover.

As best illustrated in FIG. 2, the lens 26 closing the front end of the lamp housing 12 is generally rectangular in shape. The lens 26 has a window region 190 having little or no lens action; that is, the window region is neither divergent or refractive to any appreciable degree. The other part 192 of the lens 26 is rather slightly divergent horizontally. The window region 190 is so located on the lens 26 as to pass only part of the light rays that have been reflected by the fixed reflector 18, irrespective of whether the movable reflector 20 is in the neutral or angled position. We have drawn FIG. 2 on the assumption that the movable reflector 20 of this lamp assembly 10 has the angled position depicted in FIG. 6. Thus the light rays that have been reflected by the movable reflector 20 do not traverse the window region 190 regardless of its angular position.

The provision of the window region 190 of little or no lens action in the generally divergent lens 26 is effective to create the "hot zone" in the forward illumination of the lamp assembly 10. As an additional advantage, since the light rays that have been reflected by the movable reflector 20 do not pass the window region 190, the cornering illumination will not become too intense in comparison with the forward illumination.

The lens 26 has another restricted region 194 capable of diverging light in the lateral or horizontal direction to a greater extent than the other part 192 of the lens. The greater divergence region 194 is so located on the lens 26 as to pass the light rays that have been reflected by the movable reflector 20 when the latter is in the angled position. The greater divergence region 194 is effective to horizontally expand the cornering light distribution and, additionally, to appropriately reduce the cornering illumination with respect to the forward illumination.

Second Form

Figure 11:
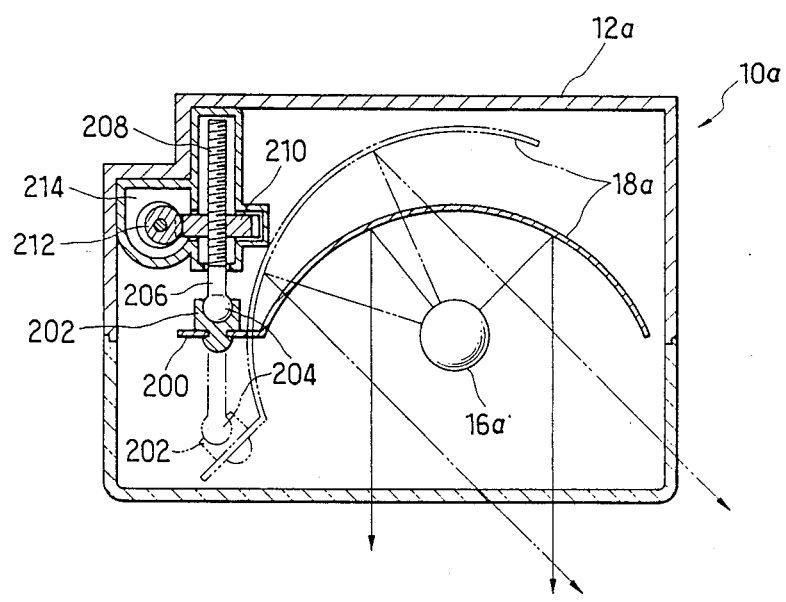
FIG. 11 is a diagrammatic horizontal section through an alternative form of the dual purpose lamp assembly in accordance with our invention.

FIG. 11 shows an alternative dual purpose lamp assembly 10a in accordance with our invention. Although this figure is rather diagrammatic, it will nevertheless be seen that the lamp assembly 10a has but one reflector 18a which performs the functions of both fixed reflector 18 and movable reflector 20 of the preceding embodiment. Movably mounted within a housing 12a and disposed behind a light source 16a, the reflector 18a has a flange 200 having a socket 202 mounted thereto. The socket 202 rotatably receives the ball end 204 of a thrust rod 206 having a screw thread 208 formed thereon. A worm wheel 210 in engagement with a worm 212 on the output shaft of a drive motor 214 is further threaded internally to mesh with the thread 208 on the thrust rod 206. The worm wheel 210 is suitably locked against axial displacment.

Normally, or when the lamp assembly 10a is being used as fog lamp, the thrust rod 206 is held retracted, holding the reflector 18a in the solid line position of FIG. 11, where the reflector reflects the light rays from the source 16a forwardly of the lamp assembly. For the use of the lamp assembly 10a as fog lamp, then, the drive motor 214 may be set into rotation in a predetermined direction to cause the thrust rod 206 to thrust forwardly, with the result that the reflector 18a is displaced laterally to the phantom position, where the reflector throws the light rays at an angle of approximately 45 degrees to the forward direction of the lamp assembly.

Although we have shown and described the dual purpose lamp assembly of our invention in terms of specific embodiments adapted for use as a combined fog and cornering lamp for vehicular use, we understand, of course, that these are by way of example only and not to impose limitations upon our invention. A variety of modifications, alterations or adaptations may be resorted to without departing from the scope of our invention.

We claim:

1. A dual purpose lamp assembly comprising:
    (a) housing means;
    (b) a light source within the housing means;
    (c) a fixed reflector fixedly mounted within the housing means and disposed behind the light source for reflecting the rays of light therefrom in a predetermined direction forwardly of the lamp assembly;
    (d) a movable reflector, smaller than the fixed reflector, disposed between the light source and the fixed reflector and pivotable between a first position, where the movable reflector coacts with the fixed reflector for reflecting the light rays from the source in the predetermined forward direction, and a second position where the movable reflector reflects part of the light rays from the source toward one side of the lamp assembly; and
    (e) drive means for pivoting the movable reflector between the first and second positions.

2. A dual purpose lamp assembly as set forth in claim 1, wherein the fixed reflector and the movable reflector are each in the shape of a paraboloid of revolution.

3. A dual purpose lamp assembly as set forth in claim 2, wherein the fixed reflector has a recessed midportion for accomodating the movable reflector, the fixed and movable reflectors being so located in relation to each other as to have a common focus, and wherein the light source is located at the common focus of the fixed and movable reflectors.

4. A dual purpose lamp assembly as set forth in claim 1, wherein the movable reflector has a pair of flanges on its top and bottom ends, the flanges being rotatably supported for the pivotal movement of the movable reflector between the first and second positions.

5. A dual purpose lamp assembly as set forth in claim 4, wherein one of the flanges of the movable reflector is adapted to be rotatably coupled to the light source.

6. A dual purpose lamp assembly as set forth in claim 5, wherein the light source is located at the common focus of the fixed and movable reflectors, and wherein the movable reflector pivots between the first and second positions about an axis passing the common focus of the fixed and movable reflectors.

7. A dual purpose lamp assembly as set forth in claim 1, wherein the drive means comprises:
    (a) a reversible electric drive motor;
    (b) a drive linkage for transmitting the bidirectional rotation of the drive motor to the movable reflector; and
    (c) a control circuit including a hand operated reflector switch for causing, upon actuation of the reflector switch, the drive motor to rotate in a predetermined direction and to an extent necessary for pivoting the movable reflector from the first to the second position and for causing, upon deactuation of the deflector switch, the drive motor to rotate in an opposite direction and to an extent necessary for pivoting the movable reflector from the second to the first position.

8. A dual purpose lamp assembly as set forth in claim 7, wherein the drive means further comprises a drive assembly including the drive motor, the drive assembly further comprising an output shaft which is driven by the drive motor and which is coupled to the drive linkage for causing therethrough the pivotal movement of the movable reflector in response to the bidirectional rotation of the drive motor.

9. A dual purpose lamp assembly as set forth in claim 8, wherein the control circuit of the drive means further comprises:
    (a) first and second fixed contacts disposed adjacent the output shaft of the drive assembly;
    (b) a contact member coupled to the output shaft of the drive assembly for joint rotation therewith and having first and second movable contacts formed thereon in electrically conducting relation with each other, the first movable contact traveling in sliding engagement with the first fixed contact during the pivotal movement of the movable reflector from the first toward the second position and riding off the first fixed contact when the movable reflector reaches the second position, the second movable contact traveling in sliding engagement with the second fixed contact during the pivotal movement of the movable reflector from the second toward the first position and riding off the second fixed contact when the movable reflector returns to the first position;
    (c) a power supply electrically connected to the contact member;
    (d) a first motor control switch operated by the reflector switch for selectively connecting one of a pair of opposite polarity terminals of the drive motor to the first fixed contact and to ground; and
    (e) a second motor control switch operated jointly with the first motor control switch by the reflector switch for selectively connecting the other of the opposite polarity terminals of the drive motor to the second fixed contact and to ground.

10. A combined fog and cornering lamp assembly readily adaptable for installation on either side of a motor vehicle, comprising:
    (a) a housing having an open front end;
    (b) a lens closing the front end of the housing;
    (c) a light source within the housing;

(d) a fixed reflector fixedly mounted within the housing for reflecting the light rays from the source in a predetermined forward direction of the lamp assembly through the lens;

(e) a movable reflector, smaller than the fixed reflector, pivotally mounted within the housing and normally held in a neutral position for reflecting the light rays from the source in the predetermined forward direction of the lamp assembly in coaction with the fixed reflector, the movable reflector being capable of angular displacement from the neutral position toward both sides of the lamp assembly for throwing part of the light rays from the source toward the opposite sides of the lamp assembly; and (f) two way drive means for pivoting the movable reflector between the neutral position and an angled position which is angularly displaced from the neutral position toward either side of the lamp assembly depending upon which side of the motor vehicle the lamp assembly is to be installed on.

11. A combined fog and cornering lamp assembly as set forth in claim 10, wherein the two way drive means comprises:

(a) a drive assembly having an output shaft capable of bidirectional rotation; and (b) a two way drive linkage connecting the output shaft of the drive assembly to the movable reflector for causing the pivotal displacement of the latter between the neutral and angled positions in response to the bidirectional rotation of the former, the two way drive linkage connecting the output shaft of the drive assembly to the movable reflector in a different way depending upon which side of the motor vehicle the lamp assembly is to be installed on, such that the movable reflector is pivoted in the required direction from the neutral position in response to the rotation of the output shaft of the drive assembly in the same direction.

12. A combined fog and cornering lamp assembly as set forth in claim 11, wherein the two way drive linkage of the two way drive means comprises:

(a) a first arm coupled to the output shaft of the drive assembly for joint rotation therewith;

(b) a second arm rotatable with the movable reflector; and (c) a link pivotally coupled at one end to the first arm and at the other end to the second arm;

(d) either of the first and second arms being adapted to be coupled to the link in either of two different angular positions about the axis of rotation thereof in order to cause the angular displacement of the movable reflector in a different direction in response to the rotation of the output shaft of the drive assembly in the same direction.

13. A combined fog and cornering lamp assembly as set forth in claim 10, further comprising neutralizing means for normally yieldably holding the movable reflector in the neutral position, the neutralizing means comprising:

(a) a pair of biasing arms rotatable independently of each other about the same axis as the movable reflector;

(b) a tension spring acting between the pair of biasing arms;

(c) a fixed abutment against both sides of which the pair of biasing arms are held under the force of the tension spring when the movable reflector is in the neutral position; and (d) an engaging member pivotable with the movable reflector about the same axis therewith and in engagement with either of the biasing arms;

(e) whereby upon angular displacement of the movable reflector from the neutral toward the angled position with the engaging member in engagement with one of the biasing arms, the tension spring acts to bias the movable reflector toward the neutral position as the other biasing arm remains in engagement with the fixed abutment.

14. A combined fog and cornering lamp assembly as set forth in claim 10, wherein the lens closing the front end of the housing is generally divergent and includes a window region having substantially no lens action, the window region being so located as to pass the light rays that have been reflected by the fixed reflector regardless of the angular position of the movable reflector.

15. A combined fog and cornering lamp assembly as set forth in claim 10, wherein the lens closing the front end of the housing is generally divergent in the lateral direction of the lamp assembly and includes a region capable of laterally diverging light to a greater extent than the other portion of the lens, the region of greater lateral divergence being so located as to pass the light rays that have been reflected by the movable reflector when the latter is in the angled position.

16. A combined fog and cornering lamp assembly as set forth in claim 10, further comprising a lamp cover mounted to the housing for pivotal movement between a working position, where the lamp cover covers at least the lens, and a retracted position where the lamp cover uncovers the lens.

17. A dual purpose lamp assembly for use on a motor vehicle or the like, comprising:

(a) housing means;

(b) a light source fixedly mounted within the housing means;

(c) a fixed reflector fixedly mounted within the housing means for reflecting light rays from the light source in a predetermined direction forwardly of the lamp assembly;

(d) a movable reflector mounted within the housing the angular displacement between a normal position where the movable reflector coacts with the fixed reflector for reflecting the light rays in the predetermined forward direction, and a moved position where the movable reflector reflects a part of the light rays toward either side of the lamp assembly; and (e) drive means for displacing the movable reflector between the normal and moved positions.

18. A dual purpose lamp assembly as set in claim 17, wherein a lens closing the front end of the housing is generally divergent and includes a window region having substantially no lens action, said window region being located so as to pass the light rays that have been reflected by the fixed reflector for each position of the movable reflector.

* * * * *